United States Patent
Gieras

(10) Patent No.: US 10,468,180 B2
(45) Date of Patent: Nov. 5, 2019

(54) ELECTROMAGNETIC ENERGY HARVESTER FOR AIRCRAFT APPLICATIONS

(71) Applicant: Rosemount Aerospace Inc., Burnsville, MN (US)

(72) Inventor: Jacek F. Gieras, Glastonbury, CT (US)

(73) Assignee: Rosemount Aerospace Inc., Burnsville, MN (US)

(*) Notice: Subject to any disclaimer, the term of this patent is extended or adjusted under 35 U.S.C. 154(b) by 119 days.

(21) Appl. No.: 15/680,828

(22) Filed: Aug. 18, 2017

(65) Prior Publication Data

US 2019/0057811 A1    Feb. 21, 2019

(51) Int. Cl.

| | |
|---|---|
| H01F 38/14 | (2006.01) |
| H02J 50/10 | (2016.01) |
| B64D 41/00 | (2006.01) |
| G05F 3/04 | (2006.01) |
| H01F 27/255 | (2006.01) |
| H01F 27/28 | (2006.01) |
| H01F 38/30 | (2006.01) |
| H01P 1/19 | (2006.01) |
| G01M 17/00 | (2006.01) |

(52) U.S. Cl.
CPC ............. *H01F 38/14* (2013.01); *B64D 41/00* (2013.01); *G05F 3/04* (2013.01); *H01F 27/255* (2013.01); *H01F 27/2823* (2013.01); *H01F 38/30* (2013.01); *H02J 50/10* (2016.02); *G01M 17/00* (2013.01); *H01F 2038/305* (2013.01); *H01P 1/19* (2013.01)

(58) Field of Classification Search
CPC .......... H01F 38/14; H01F 27/28; F02C 7/266; H01Q 1/28; H01Q 1/26; H01Q 1/00; H05B 6/365

USPC ..... 307/9.1, 10.1, 10.2, 10.6, 66, 64, 43, 82, 307/109

See application file for complete search history.

(56) References Cited

U.S. PATENT DOCUMENTS

| | | | | |
|---|---|---|---|---|
| 5,301,362 | A * | 4/1994 | Ohkawa | G01S 5/04 375/295 |
| 5,554,933 | A * | 9/1996 | Logue | B82Y 15/00 324/233 |
| 7,098,547 | B1 * | 8/2006 | Burns | H02S 99/00 290/1 R |
| 8,564,298 | B2 | 10/2013 | Ali et al. | |
| 9,448,257 | B2 | 9/2016 | Saxby et al. | |

(Continued)

FOREIGN PATENT DOCUMENTS

EP    2688075 A1    1/2014

OTHER PUBLICATIONS

Extended European Search Report for EP Application No. 18189004.7, dated Jan. 15, 2019, pp. 7.

*Primary Examiner* — Fritz M Fleming
*Assistant Examiner* — Jagdeep S Dhillon
(74) *Attorney, Agent, or Firm* — Kinney & Lange, P.A.

(57) ABSTRACT

An energy harvester system includes an aircraft power cable carrying an alternating current and an energy harvester. The energy harvester includes a ferromagnetic ring encircling the aircraft power cable and configured so that the alternating current in the aircraft power cable generates magnetic flux in the ferromagnetic ring and an inductive coil wrapped around at least a portion of the ferromagnetic ring to generate a voltage from the magnetic flux in the ferromagnetic ring.

14 Claims, 3 Drawing Sheets

(56) References Cited

U.S. PATENT DOCUMENTS

| | | | |
|---|---|---|---|
| 2006/0137354 A1* | 6/2006 | Ponziani | F02C 7/266 |
| | | | 60/772 |
| 2011/0242989 A1* | 10/2011 | Kim | H04L 25/0266 |
| | | | 370/242 |
| 2014/0021936 A1* | 1/2014 | Lu | H01F 38/30 |
| | | | 323/358 |
| 2015/0180376 A1 | 6/2015 | Becker et al. | |
| 2015/0365018 A1* | 12/2015 | Inman | H01L 41/1136 |
| | | | 607/35 |
| 2016/0099679 A1* | 4/2016 | Babaie | H03B 5/1215 |
| | | | 331/117 FE |
| 2017/0105299 A1* | 4/2017 | Rodriguez | G01R 19/15 |
| 2017/0179732 A1 | 6/2017 | Hoeppner et al. | |
| 2017/0190431 A1* | 7/2017 | Dichek | G01P 5/165 |
| 2017/0199533 A1 | 7/2017 | McCollough | |
| 2019/0020210 A1* | 1/2019 | Partovi | H02J 7/025 |
| 2019/0051431 A1* | 2/2019 | Orban | H01B 9/003 |

\* cited by examiner

ELECTROMAGNETIC ENERGY HARVESTER FOR AIRCRAFT APPLICATIONS

BACKGROUND

Energy harvesting for aircraft-based applications has gained considerable interest as a means of realizing a localized power source, thus reducing the weight and complexity of aircraft wiring networks. Kinetic energy harvesters suffer from reliability issues and struggle to operate in the low vibration levels typical for modern aircraft. Thermoelectric generators with phase-change materials have been demonstrated for powering sensors outside the heated cabin environment, but are expensive.

SUMMARY

In one example, an energy harvester system comprises an aircraft power cable carrying an alternating current therethrough and an energy harvester. The energy harvester comprises a ferromagnetic ring encircling the aircraft power cable and configured so that the alternating current in the aircraft power cable generates magnetic flux in the ferromagnetic ring and an inductive coil wrapped around at least a portion of the ferromagnetic ring to generate a voltage from the magnetic flux generated in the ferromagnetic ring.

In one example, a method comprises generating a magnetic flux in a ferromagnetic ring that encircles an aircraft power cable using an alternating current of the aircraft power cable; and generating a voltage from the magnetic flux using an inductive coil wrapped around at least a portion of the ferromagnetic ring.

DETAILED DESCRIPTION

Apparatus, systems, and associated methods relate to energy harvesting using an electromagnetic energy harvester. Using the apparatus, systems, and associated methods herein, allows the use of electromagnetic energy harvesters wherever an alternating current (AC) power cable exists. Separate power lines do not need to be installed spanning the length from the power source to various sensors and other low power devices. Instead, an electromagnetic energy harvester can be installed at the nearest AC power cable to provide power to various low power devices. A split ferromagnetic ring is installed, encircling the AC power cable. The ferromagnetic ring directs magnetic flux generated by the AC current in the power cable through an inductive coil which generates a voltage across the coil. The voltage across the coil is used to power electronic devices.

Figure 1A:
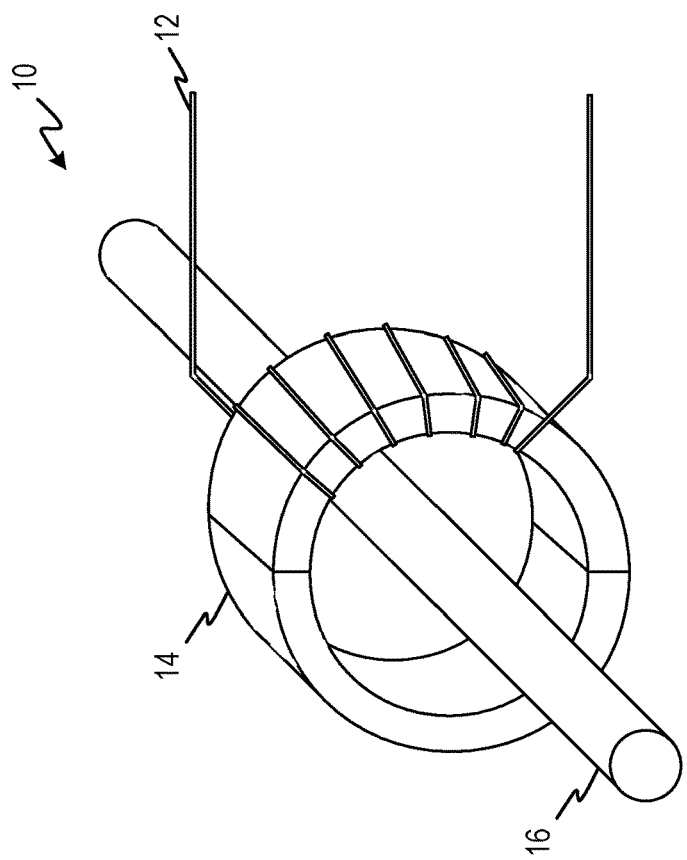
FIG. 1A is a perspective view of an electromagnetic energy harvester according to an embodiment of the present invention.

FIG. 1A is a perspective view of electromagnetic energy harvester 10 including inductive coil 12, ferromagnetic ring 14, and AC power cable 16.

Ferromagnetic ring 14 encircles AC power cable 16 and inductive coil 12 is wrapped multiple times around ferromagnetic ring 14. Ferromagnetic ring 14 can be made of laminated steel, laminated ferromagnetic alloys, ferrite or other powder ferromagnetic material. Ferromagnetic ring 14 is a split ferromagnetic ring. Split ferromagnetic rings can be taken apart in halves to allow the split ferromagnetic ring to be easily placed around a power cable such as AC power cable 16. The alternating current of AC power cable 16 produces a magnetic flux which is focused by ferromagnetic ring 14. The magnetic flux in ferromagnetic ring 14 in turn induces a voltage across inductive coil 12. This voltage can be used to power wireless sensors, low power integrated circuits, and other low power consumption electronic devices.

Figure 1B:
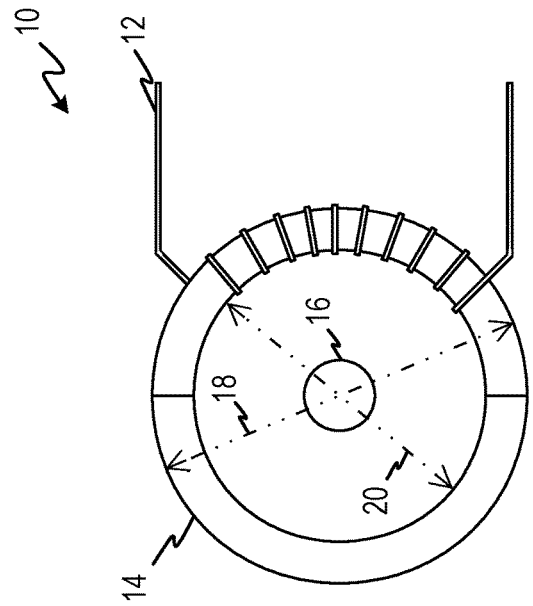
FIG. 1B is a side view of an electromagnetic energy harvester according to an embodiment of the present invention.

FIG. 1B is a side view of electromagnetic energy harvester 10 including inductive coil 12, ferromagnetic ring 14, and AC power cable 16. Ferromagnetic ring 14 has outer diameter 18 and inner diameter 20.

The voltage (E) produced by electromagnetic energy harvester 10 is dependent on the number of turns (N) of inductive coil 12, the current (I) of AC power cable 16, the power line frequency (f) of AC power cable 16, the relative magnetic permeability ($\mu_r$) of ferromagnetic ring 14, the magnetic permeability of free space ($\mu_0$), outer diameter 18 (D) of ferromagnetic ring 14, inner diameter 20 (d) of ferromagnetic ring 16, and length of inductive coil 12 (l). The resulting equation is:

$$E = 2\pi f N I \mu_0 \mu_r \ln\left(\frac{D}{d}\right) l \quad \text{(Equation 1)}$$

In one embodiment, power cable 16 is an aircraft power cable. Benefits of using electromagnetic energy harvester 10 in aircraft include reduction of the weight and complexity of aircraft wiring networks. Electromagnetic energy harvesters can be used to branch off a power line from a power cable to low power devices instead of running an individual cable from the main power source to each low power device. By not needing long individual power cables for each device weight is reduced and power supplies have fewer cables attached. Electromechanical energy harvester 10 is also very reliable because it does not have any moving mechanical components. The lack of mechanical moving parts also allows electromechanical energy harvester 10 to be a low volume lightweight device.

Figure 2:
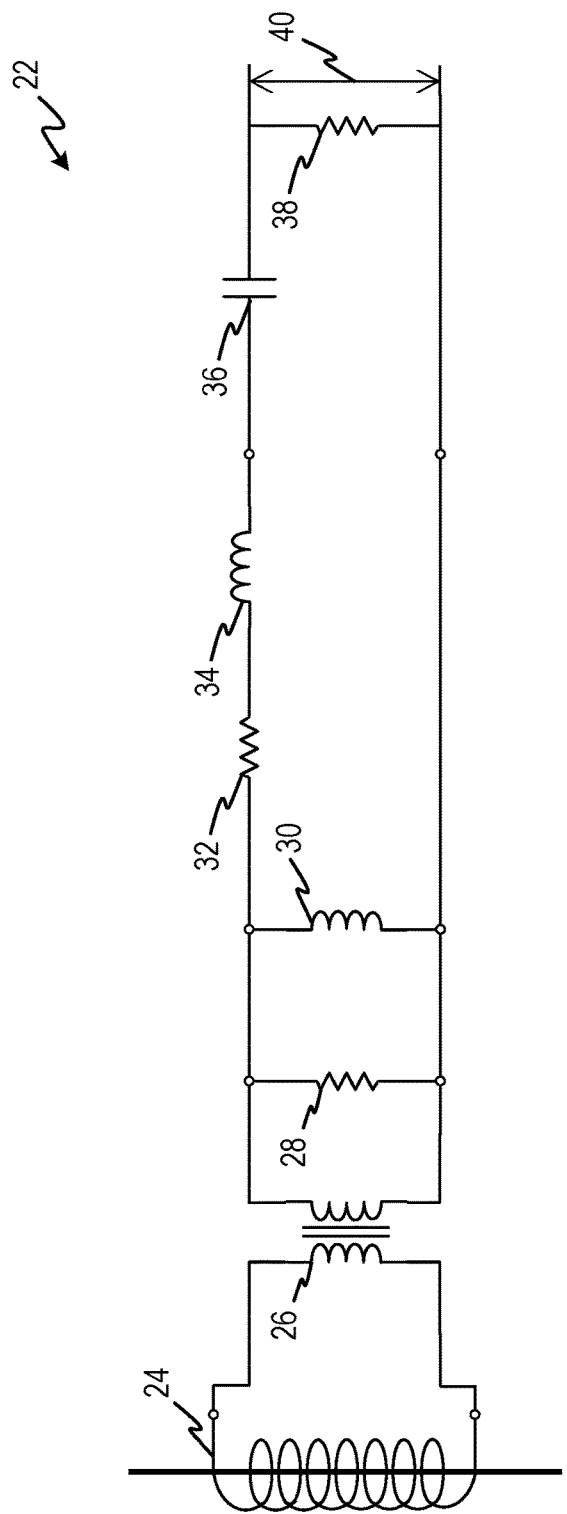
FIG. 2 is a schematic diagram of an equivalent circuit of an electromagnetic energy harvester according to an embodiment of the present invention.

FIG. 2 is a schematic diagram of equivalent circuit 22 of an electromagnetic energy harvesting system including electromagnetic energy harvester 24, step-up transformer 26, core loss resistance 28, coil inductance 30, winding resistance 32, leakage inductance 34, tuning capacitor 36, load resistance 38, and load voltage 40.

The voltage of electromagnetic energy harvester 24 feeds the primary winding of step-up transformer 26. In some examples, the size of the ferromagnetic ring of electromagnetic energy harvester 24 limits the length and number of turns possible for the inductive coil, thus limiting the voltage provided by electromagnetic energy harvester 24. When the size of the ferromagnetic ring limits the voltage provided, step-up transformer 26 can be used to increase load voltage 40. Coil inductance 30 ($L_w$) and leakage inductance 34 ($L_o$) are present in electromagnetic energy harvester 24. They are represented by inductors in equivalent circuit 22, but leakage inductance 34 does not represent actual physical component of the electromagnetic energy harvesting system and coil inductance 30 is a property of electromagnetic energy harvester 24. Likewise winding resistance 32 ($R_w$) and core loss resistance 28 ($R_{Fe}$) of electromagnetic energy harvester 24 are represented as resistors, but core loss resistance does not represent an actual physical component and winding resistance 32 is a property of electromagnetic energy harvester 24. Tuning capacitor 36 ($C_t$) is chosen to resonate with coil inductance 30 at a specific frequency. Load resistance 38 ($R_L$) is represented by a resistor, and can be any low power device. The voltage across load resistance 38 is load voltage 40 ($V_L$). For some frequencies of interest, e.g. 200-2000 Hz, the core loss resistance 28 is negligible.

Coil inductance 30 and tuning capacitor 36 determine the resonant frequency of electromagnetic energy harvester 24. The relationship is given by the equation:

$$f_y = \frac{1}{2\pi\sqrt{L_w C_t}} \qquad \text{(Equation 2)}$$

Tuning capacitor 36 is chosen to tune the resonant frequency to a frequency that provides the appropriate power output of the electromagnetic energy harvesting system for the coupled low power device.

Figure 3:
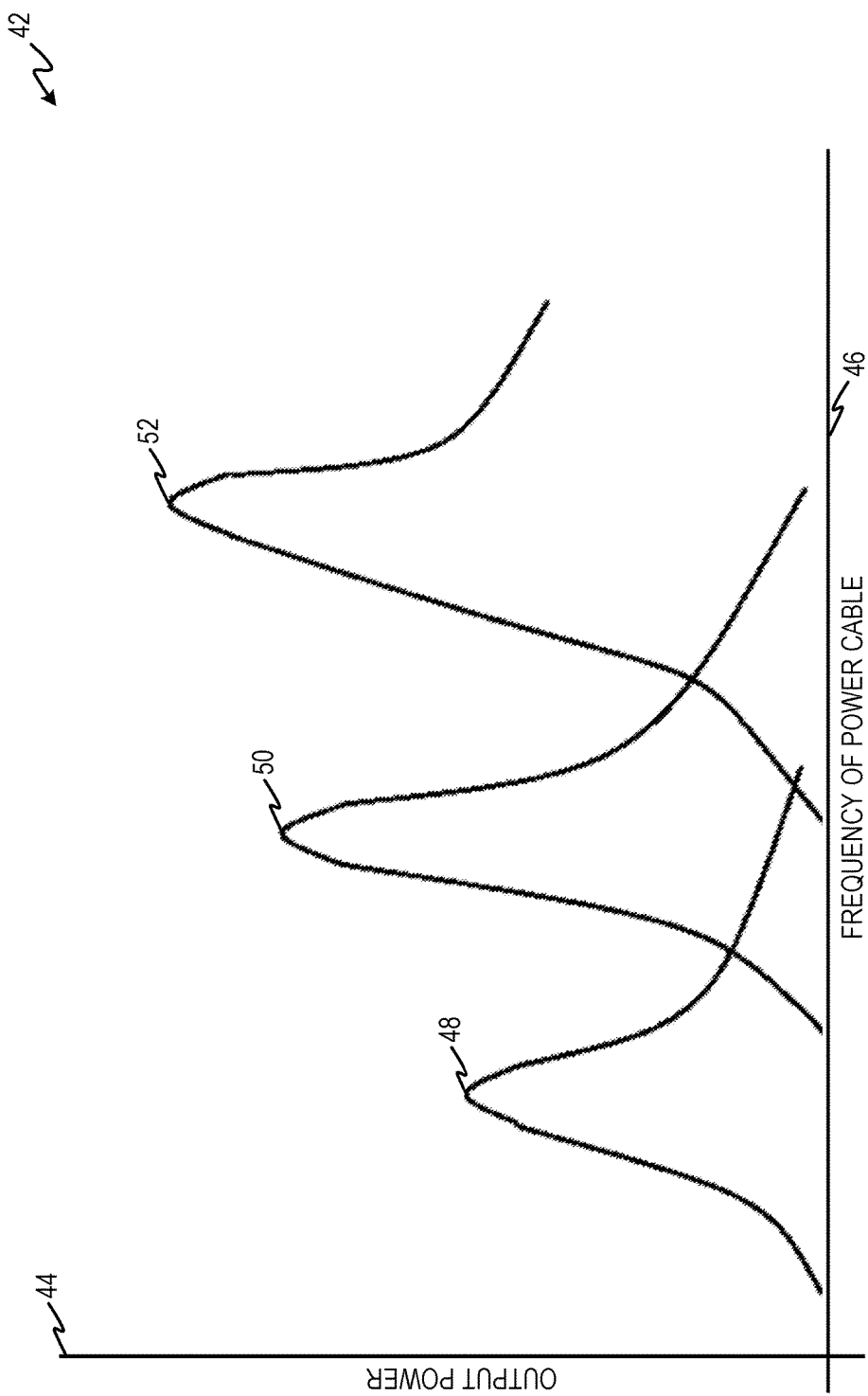
FIG. 3 is a graph of power output of an electromagnetic energy harvester based upon a tuning capacitor of the electromagnetic energy harvester and a frequency of the power line.

FIG. 3 is a graph 42 of power output of an electromagnetic energy harvester system based upon a tuning capacitor of the electromagnetic energy harvester and a frequency of the power cable. Graph 42 plots output power on y-axis 44 and frequency of the power line on x-axis 46. Graph 42 includes curves 48, 50, and 52. Each of the curves corresponds to a different capacitance for tuning capacitor 36.

As shown, the output power for each curve changes with the frequency of the power cable. As the frequency of the power cable increases, the capacitance of the tuning capacitor must decrease to increase the output power. Each tuning capacitor provides a different peak output power, showing that achieving the desired output power is a product of choosing a tuning capacitor based upon coil inductance of the electromagnetic energy harvester and the frequency of the power cable.

Accordingly, implementing techniques of this disclosure, electromagnetic energy harvester systems provide power to electronic devices from an AC power cable. Using electromagnetic energy harvester systems, power can be supplied to electronic devices without having to us a dedicated power cable. Various power requirements of multiple electronic devices can be met from one AC power cable by tuning each electromagnetic energy harvester system to the power needs of their associated electronic device.

Discussion of Possible Embodiments

The following are non-exclusive descriptions of possible embodiments of the present invention.

An energy harvester system can comprise an aircraft power cable carrying an alternating current therethrough; an energy harvester can comprise a ferromagnetic ring encircling the aircraft power cable and configured so that the alternating current in the aircraft power cable generates magnetic flux in the ferromagnetic ring; and an inductive coil wrapped around at least a portion of the ferromagnetic ring to generate a voltage from the magnetic flux in the ferromagnetic ring.

The energy harvester system of the preceding paragraph can optionally include, additionally and/or alternatively, any one or more of the following features, configurations and/or additional components:

The ferromagnetic ring can be a split ferromagnetic ring.

The energy harvester can be electrically coupled to a step-up transformer via the inductive coil to step up the voltage generated by the inductive coil.

A tuning capacitor can be electrically coupled to the step-up transformer.

The tuning capacitor can have a value that yields peak output voltage for a frequency of the alternating current.

The energy harvester can be electrically coupled to a load via the inductive coil to provide power to the load.

The load can be at least one sensor of an aircraft.

The ferromagnetic ring can be made of ferrite.

A frequency of the alternating current can be 200-2000 Hz.

A method can comprise generating a magnetic flux in a ferromagnetic ring that encircles an aircraft power cable using an alternating current of the aircraft power cable; and generating a voltage from the magnetic flux in the ferromagnetic ring using an inductive coil wrapped around at least a portion of the ferromagnetic ring.

The method of the preceding paragraph can optionally include, additionally and/or alternatively, any one or more of the following features, configurations and/or additional components:

The ferromagnetic ring can be a split ferromagnetic ring.

Stepping up the voltage generated by the inductive coil can include using a step-up transformer electrically coupled to the inductive coil.

A tuning capacitor can be electrically coupled to the step-up transformer.

The tuning capacitor can have a value that yields peak output voltage for a frequency of the alternating current.

Providing power to a load can include using the inductive coil.

The load can be at least one sensor of an aircraft.

The ferromagnetic ring can be made of ferrite.

A frequency of the alternating current can be 200-2000 Hz.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An energy harvester system comprising:
 an aircraft power cable carrying an alternating current therethrough;
 an energy harvester comprising:
  a ferromagnetic ring encircling the aircraft power cable and configured so that the alternating current in the aircraft power cable generates magnetic flux in the ferromagnetic ring; and
  an inductive coil wrapped around at least a portion of the ferromagnetic ring to generate a voltage from the magnetic flux in the ferromagnetic ring;

a step-up transformer electrically coupled to the energy harvester via the inductive coil to step up the voltage generated by the inductive coil; and a tuning capacitor is electrically coupled to the step-up transformer.

2. The energy harvester system of claim 1, wherein the ferromagnetic ring is a split ferromagnetic ring.

3. The energy harvester system of claim 1, wherein the tuning capacitor has a value that yields peak output voltage for a frequency of the alternating current.

4. The energy harvester system of claim 1, wherein the energy harvester is electrically coupled to a load via the inductive coil to provide power to the load.

5. The energy harvester system of claim 4, wherein the load is at least one sensor of an aircraft.

6. The energy harvester system of claim 1, wherein the ferromagnetic ring is made of ferrite.

7. The energy harvester system of claim 1, wherein a frequency of the alternating current is 200-2000 Hz.

8. A method comprising:

generating a magnetic flux in a ferromagnetic ring that encircles an aircraft power cable using an alternating current of the aircraft power cable;

generating a voltage from the magnetic flux in the ferromagnetic ring using an inductive coil wrapped around at least a portion of the ferromagnetic ring; and stepping up the voltage generated by the inductive coil using a step-up transformer electrically coupled to the inductive coil, wherein a tuning capacitor is electrically coupled to the step-up transformer.

9. The method of claim 8, wherein the ferromagnetic ring is a split ferromagnetic ring.

10. The method of claim 8, wherein the tuning capacitor has a value that yields peak output voltage for a frequency of the alternating current.

11. The method of claim 8, further comprising providing power to a load using the inductive coil.

12. The method of claim 11, wherein the load is at least one sensor of an aircraft.

13. The method of claim 8, wherein the ferromagnetic ring is made of ferrite.

14. The method of claim 8, wherein a frequency of the alternating current is 200-2000 Hz.

* * * * *